United States Patent
Collins et al.

[11] Patent Number: 6,074,323
[45] Date of Patent: Jun. 13, 2000

[54] ANNULUS GEAR FOR AN AUTOMATIC TRANSMISSION AND METHOD OF CONSTRUCTION

[75] Inventors: John C. Collins, Lake Orion; Berthold Martin, Shelby Township, both of Mich.

[73] Assignee: DaimlerChrysler Corporation, Auburn Hills, Mich.

[21] Appl. No.: 09/282,918

[22] Filed: Mar. 31, 1999

[51] Int. Cl.⁷ .................................................. F16H 57/08
[52] U.S. Cl. ........................ 475/331; 475/286; 475/317
[58] Field of Search .................................. 475/331, 317, 475/276, 279, 280, 282, 286, 290

[56] References Cited

U.S. PATENT DOCUMENTS

| | | | |
|---|---|---|---|
| 4,023,389 | 5/1977 | Dibble et al. | 72/38 |
| 4,096,769 | 6/1978 | Horikiri et al. | |
| 4,177,665 | 12/1979 | Schurmann | 72/359 |
| 4,875,391 | 10/1989 | Leising et al. | |
| 5,308,295 | 5/1994 | Michioka et al. | 475/286 X |
| 5,533,945 | 7/1996 | Martin et al. | 475/276 |
| 5,536,220 | 7/1996 | Martin et al. | 475/275 |
| 5,588,929 | 12/1996 | Benford | 475/276 |
| 5,769,749 | 6/1998 | Funahashi et al. | 475/276 |
| 5,927,121 | 7/1999 | Rolf et al. | 72/68 |
| 5,972,418 | 10/1999 | Koestermeier | 427/11 |

OTHER PUBLICATIONS

U.S. application No. 09/283,927, filed Apr. 1, 1999, Holbrook.
U.S. application No. 09/282,671, Mar. 31, 1999, Nassar.
U.S. application No. 09/283,073, Mar. 31, 1999, Nogle.
U.S. application No. 09/283,912, Apr. 1, 1999, Redinger.
U.S. application No. 09/282,375, Mar. 31, 1999, Dourra.
U.S. application No. 09/281,861, Mar. 31, 1999, Martin.
U.S. application No. 09/282,234, Mar. 31, 1999, Martin.
U.S. application No. 09/282,376, Mar. 31, 1999, Nogle.
U.S. application No. 09/282,675, Mar. 31, 1999, Martin.
U.S. application No. 09/282,383, Collins, filed Mar. 31, 1999.
U.S. application No. 09/282,991, Martin, filed Mar. 31, 1999.
U.S. application No. 09/282,676, Martin, filed Mar. 31, 1999.
U.S. application No. 09/282,988, Martin, filed Mar. 31, 1999.
U.S. application No. 09/282,368, Collins, filed Mar. 31, 1999.
U.S. application No. 09/282,987, Nogle, filed Mar. 31, 1999.
U.S. application No. 09/282,918, Collins, filed Mar. 31, 1999.
U.S. application No. 09/283,911, Holbrook, filed Apr. 1, 1999.

(List continued on next page.)

*Primary Examiner*—Sherry L. Estremsky
*Attorney, Agent, or Firm*—Marc Lorelli

[57] ABSTRACT

An annulus gear for an automatic transmission and method of construction. The annulus gear is a one-piece or monolithic gear having a set of gear teeth formed on an inner surface thereof for operably coupling with a set of planetary gears. A plurality of lugs extend axially from a rearward edge of the annulus gear and cooperate with a plurality of radially extending tangs formed on an adjacent clutch hub for rotatably coupling the annulus gear with an adjacent clutch mechanism. Similarly, a forward edge of the annulus gear has a plurality of reliefs formed therein which are adapted to receive a plurality of tangs radially extending from an adjacent planetary gear set carrier. In this manner, the annulus gear may also be operably coupled to an adjacent planetary gear set.

20 Claims, 4 Drawing Sheets

OTHER PUBLICATIONS

U.S. application No. 09/282,670, Redinger, filed Mar. 31, 1999.

U.S. application No. 09/282,791, Redinger, filed Mar. 31, 1999.

U.S. application No. 09/282,990, Botosan, filed Mar. 31, 1999.

U.S. application No. 09/282,669, Botosan, filed Apr. 1, 1999.

U.S. application No. 09/283,899, Holbrook, filed Apr. 1, 1999.

U.S. application No. 09/283,910, Holbrook, filed Apr. 1, 1999.

U.S. application No. 09/283,454, Holbrook, filed Apr. 1, 1999.

U.S. application No. 09/283,567, Danielson, filed Mar. 31, 1999.

U.S. application No. 09/283,885, Toussagnon, filed Apr. 1, 1999.

U.S. application No. 09/295,713, Nassar, filed Apr. 21, 1999.

U.S. application No. 09/296,022, Nassar, filed Apr. 21, 1999.

U.S. application No. 09/251,258, Botosan, filed Feb. 16, 1999.

U.S. application No. 09/210,977, Correa, filed Dec. 14, 1998.

U.S. application No. 09/168,836, Dourra, filed Oct. 8, 1998.

U.S. application No. 09/277,444, Dourra, filed Mar. 26, 1999.

U.S. application No. 09/273,670, Black, filed Mar. 23, 1999.

ANNULUS GEAR FOR AN AUTOMATIC TRANSMISSION AND METHOD OF CONSTRUCTION

BACKGROUND OF THE INVENTION

1. Technical Field

The present invention generally pertains to an automatic transmission for a motor vehicle. More specifically, but without restriction to the particular embodiment or use which is shown and described for purposes of illustration, the present invention relates to a one-piece annulus gear of a planetary gear set manufactured using a flow forming process.

2. Description Of The Related Art

A conventional automatic transmission includes a hydrodynamic torque converter to transfer engine torque from an engine crank shaft to a rotatable input member of the transmission through fluid-flow forces. The transmission also includes frictional units, typically referred to as clutches or brakes, which couple the rotatable input member to a member of a planetary gear set or hold a member of the planetary gear set stationary during the transmission of power. Such automatic transmissions typically provide for multiple planetary gear sets in order to provide various ratios of torque and to ensure that the available torque and the respective tractive power demand are matched. Thus, the internal components of an automatic transmission are numerous and complex.

There is a continuous effort to optimize the components of the automatic transmission and minimize the weight thereof by the use of lighter weight materials such as aluminum or alternately through improvements in the component design.

SUMMARY OF THE INVENTION

It is a general object of the present invention to provide a four-speed automatic transmission for an automotive vehicle.

It is another object of the present invention to provide a one-piece annulus gear for a planetary gear set of the automatic transmission.

It is a further object of the present invention to provide a method for fabricating the one-piece annulus gear which optimizes the features for interconnecting the annulus gear to other components in the automatic transmission while minimizing the amount of machining performed thereon.

To achieve the foregoing objects, the present invention is a four-speed automatic transmission for a vehicle including a transmission housing, an input member, an output member, a plurality of planetary gear sets for changing a ratio of torque between the input member and the output member, a plurality of clutch members to selectively couple the input member to the planetary gear sets or alternately coupled the planetary gear sets to the transmission housing. The annulus gear associated with one planetary gear set is a one-piece fabrication which is flow formed and subsequently machined to provide a set of gear teeth. A set of lugs are formed on an end of the annulus gear during the flow forming process and cooperate with a complementary set of lugs formed on a clutch hub of the low-reverse clutch mechanism. A set of reliefs are formed on an inner surface of the annulus gear and are adapted to receive a set of tangs extending radially from an adjacent planetary carrier. Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
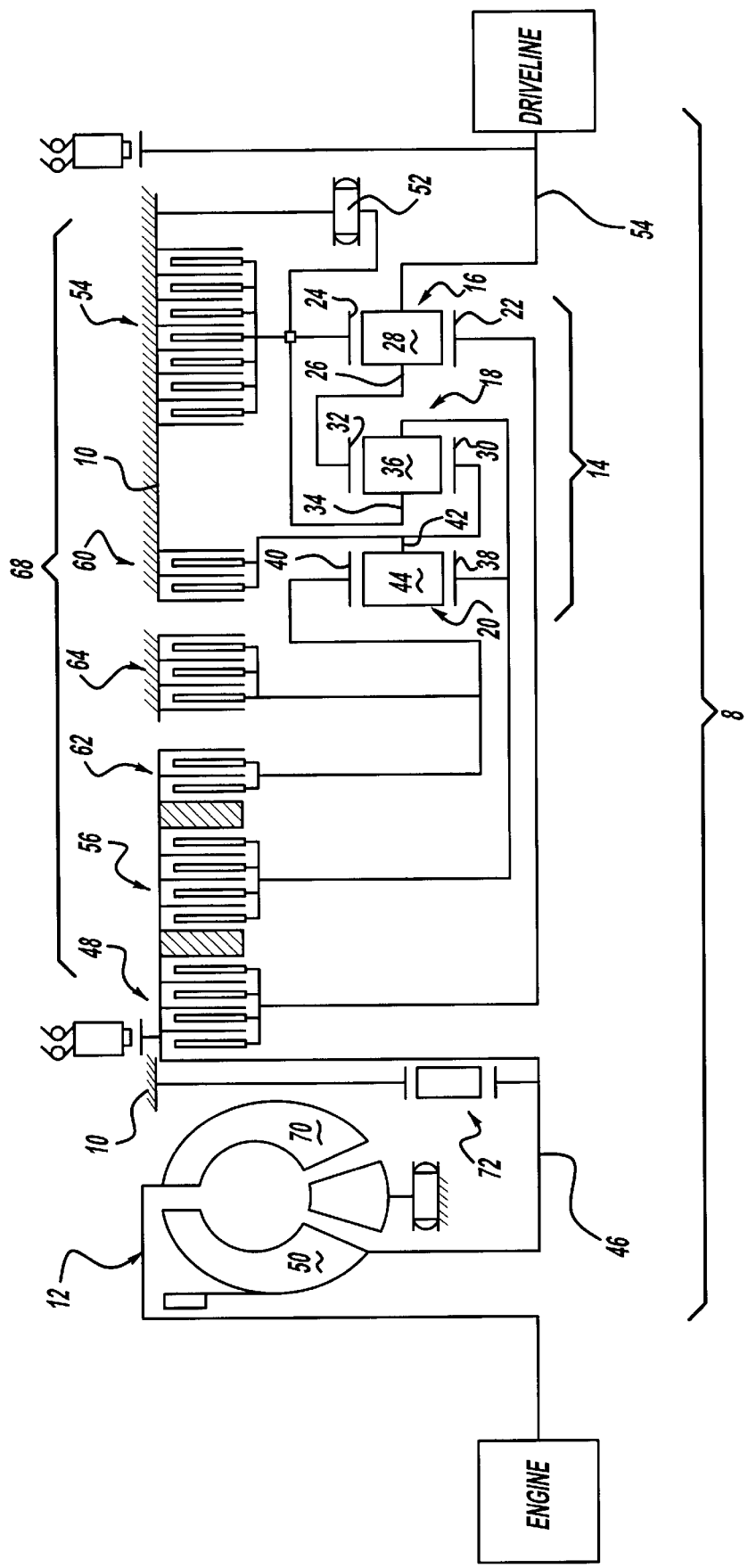
FIG. 1 is a schematic representation of a transmission of a motor vehicle in accordance with the teaching of a preferred embodiment of the present invention.

With reference to FIG. 1, a four-speed automatic transmission 8 is shown according to the principles of the present invention. The automatic transmission 8 includes a housing 10 enclosing a torque converter 12 which is operably connected to a multiple planetary gear system 14. Multiple planetary gear system 14 includes a first planetary gear set 16, a second planetary gear set 18, and a third planetary gear set 20. The first planetary gear set 16 includes a sun gear 22, an annulus gear 24, a planetary carrier 26 and a plurality of planetary gears 28 rotatably mounted to planetary carrier 26. The second planetary gear set 18 includes a sun gear 30, an annulus gear 32, a planetary carrier 34 and a plurality of planetary gears 36 rotatably mounted on planetary carrier 34. The third planetary gear set 20 includes a sun gear 38, an annulus gear 40, a planetary carrier 42 and a plurality of planetary gears 44 rotatably mounted on planetary carrier 42.

Input shaft 46 which is driven by a turbine 50 of torque converter 12 selectively drives sun gear 22 of the first planetary gear set 16 upon engagement of an underdrive clutch mechanism 48. Annulus gear 24 of first planetary gear set 16 is attached to planetary carrier 34 of second planetary gear set 18. Annulus gear 24 is also operably coupled to free wheeling clutch assembly 52, as well as low-reverse clutch mechanism 54. Planetary carrier 34 of second planetary gear set 18 is attached to sun gear 38 of third planetary gear set 20. Annulus gear 24 of first planetary gear set 16, planetary carrier 34 of second planetary gear set 18, and sun gear 38 of third planetary gear set 20 may be operably coupled to input shaft 46 by an overdrive clutch mechanism 56 when engaged.

Planetary carrier 26 of first planetary gear set 16 is operably coupled to an output shaft 58 and is also coupled to annulus gear 32 of second planetary gear set 18. Sun gear 30 of second planetary gear set 18 is coupled to planetary carrier 42 of third planetary gear set 20 which is engageable by a second gear clutch mechanism 60 to prevent rotation of planetary carrier 42 and sun gear 30 relative to transmission housing 10. Annulus gear 40 of third planetary gear set 20 is engageable by a reverse clutch mechanism 62 for selectively engaging annulus gear 40 with input shaft 46. In addition, annulus gear 40 of third planetary gear set 20 is also engageable with a fourth gear clutch mechanism 64 for preventing rotation of annulus gear 40 relative to transmission housing 10. Annulus 24 of first planetary gear set 16 is operably coupled to low-reverse clutch mechanism 54 for preventing rotation thereof relative to transmission housing 10.

In this manner, input shaft 46 is operably coupled to output shaft 58 through multiple planetary gear system 14.

Multiple clutch system 68 including underdrive clutch mechanism 48, overdrive clutch mechanism 56, second gear clutch mechanism 60, reverse clutch mechanism 62, fourth gear clutch mechanism 64 and low-reverse clutch mechanism 54 are operable to selectively engage multiple planetary gear system 14 for driving output shaft 58 at various predetermined drive ratios. Torque converter 12 includes an impeller 70 in order to achieve torque multiplication, as is well known in the art. Oil pump assembly 72 is operably coupled to input shaft 46 to energize the hydraulic fluid present in automatic transmission 8 for lubricating the components thereof and for providing hydraulic pressure for actuation of the various clutch mechanisms of multiple clutch system 68.

Figure 2:
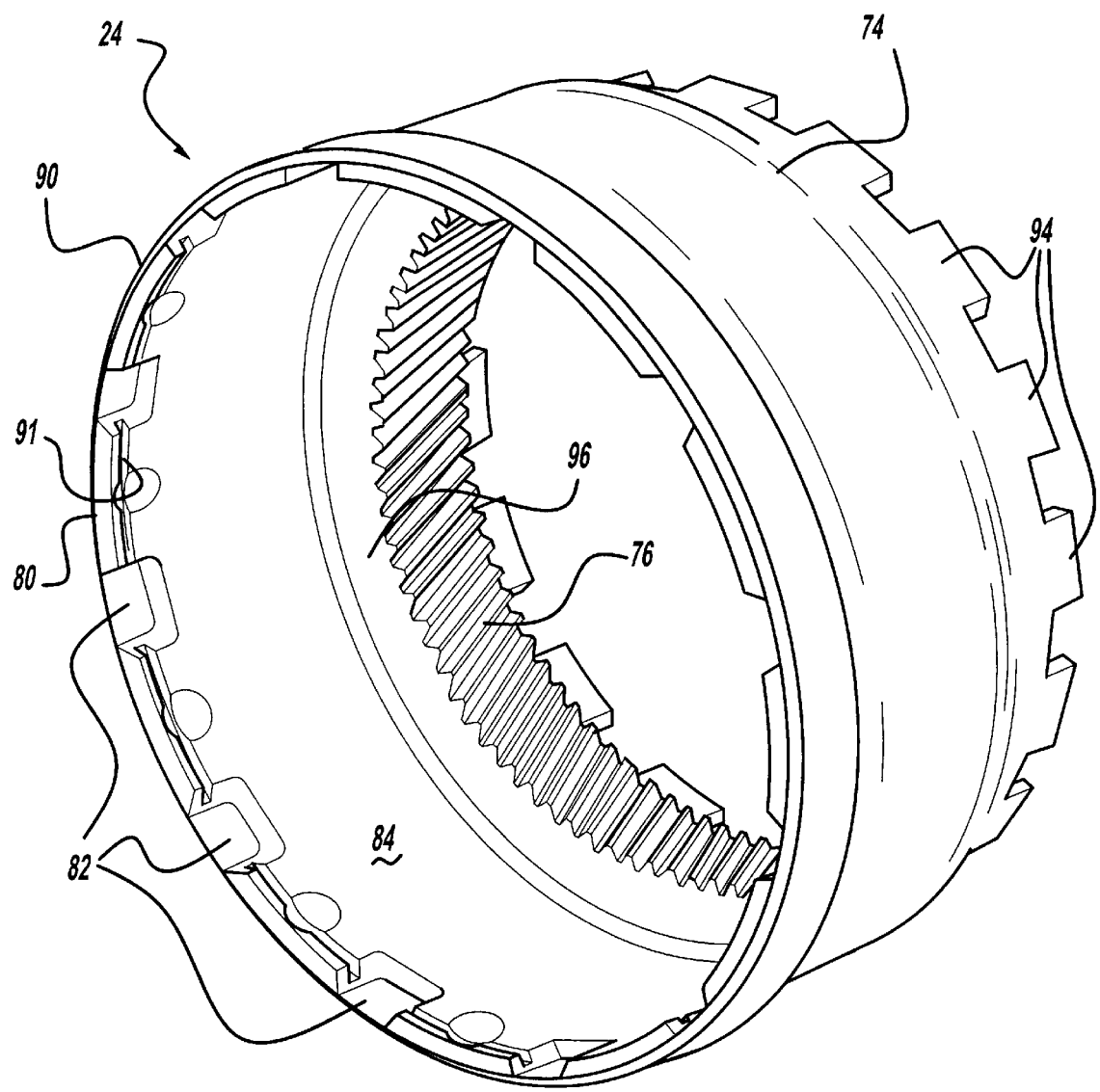
FIG. 2 is a perspective view of the one-piece flow formed annulus gear of the present invention.
Figure 3:
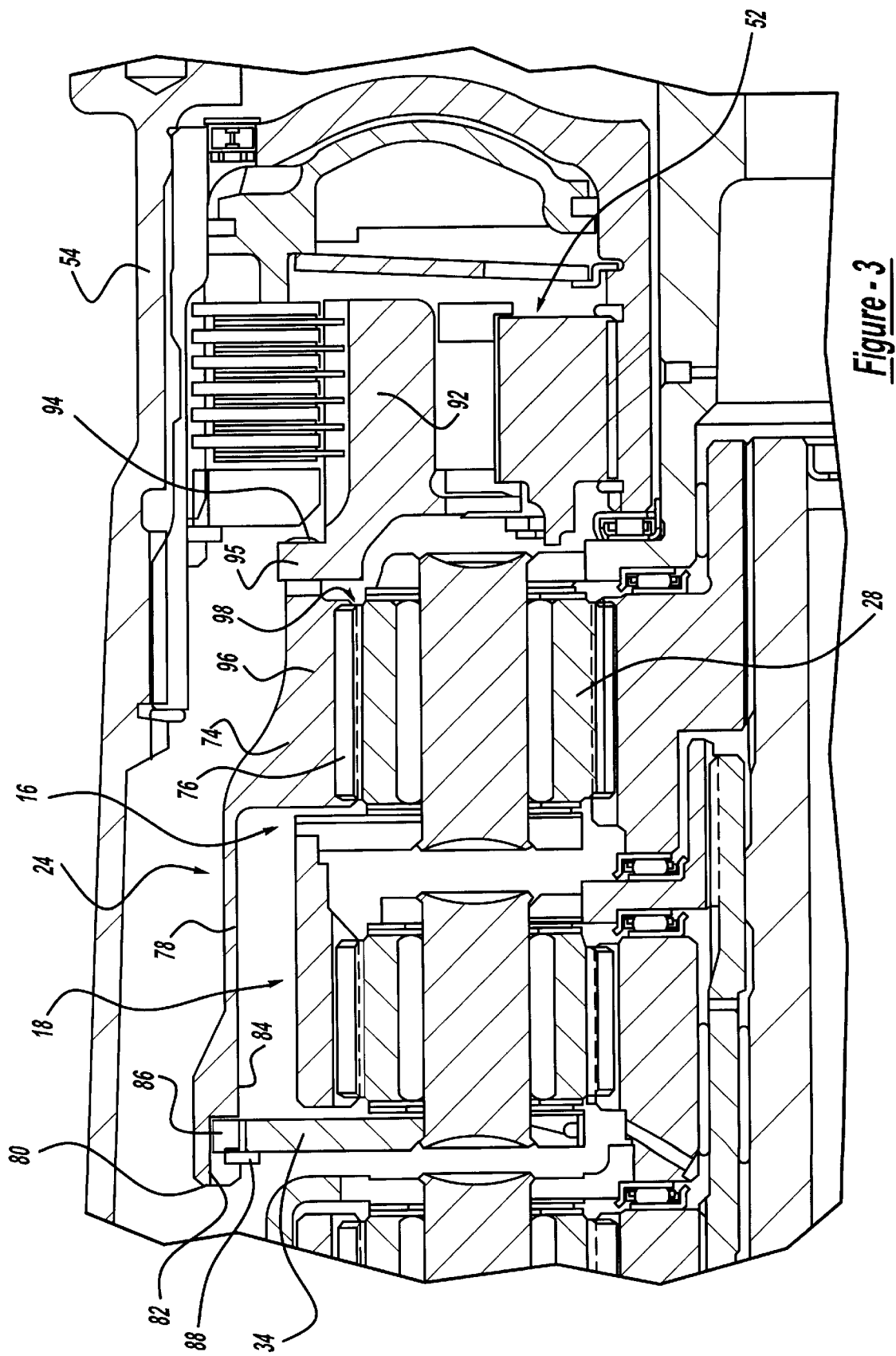
FIG. 3 is an enlarged cross-sectional view of an automatic transmission incorporating the one-piece annulus gear.

With reference now to FIGS. 2 and 3, a one-piece annulus gear 24 is illustrated which is preferably flow formed from a suitable gear steel. As previously described, annulus gear 24 forms a portion of first planetary gear set 16 and operably couples to planetary carrier 34 of second planetary gear set 18. More specifically, annulus gear 24 includes a first annular portion 74 having a plurality of gear teeth 76 machined therein which are operable to engage complementary gear teeth formed on planetary gears 28 of first planetary gear set 16. Annulus gear 24 also includes second annular portion 78 which extends forwardly toward torque converter 12 and terminates at forward edge 80. A set of reliefs 82 are formed on an inner surface 84 of second annular portion 78. As presently preferred, twelve reliefs are equally spaced around the circumference of inner surface 84 and are adapted to receive complementary tangs 86 extending radially outwardly from planetary carrier 34 of second planetary gear set 18. A retainer ring 88 is disposed within an annular groove 91 also formed in the inner surface 84 of second annular portion 78. Reliefs 82 in conjunction with radially extending tangs 86 couple annular gear 24 and planetary carrier 34 for concurrent rotation. In this manner, first planetary gear set 16, and more specifically annulus gear 24, is rotatably coupled with second planetary gear set 18 and more specifically planetary carrier 34.

The rearward edge 90 of annulus gear 24 is operably coupled to clutch hub 92 of low-reverse clutch assembly 54. More specifically, rearward edge 90 has a plurality of lugs 94 extending axially from annulus gear 24. As presently preferred, sixteen (16) lugs are equally spaced around the circumference of rearward edge 90. Lugs 94 cooperate with a complementary set of tangs 95 which are formed on clutch hub 92 of low-reverse clutch mechanism 54 and extend radially outwardly. Lugs 94 in conjunction with radially extending tangs 95 couple annulus gear 24 and clutch hub 92 for concurrent rotation. In this manner, first planetary gear set 16, and more specifically, annulus gear 24 is rotatably coupled with low-reverse clutch assembly 54, and more specifically clutch hub 92.

Figure 4:
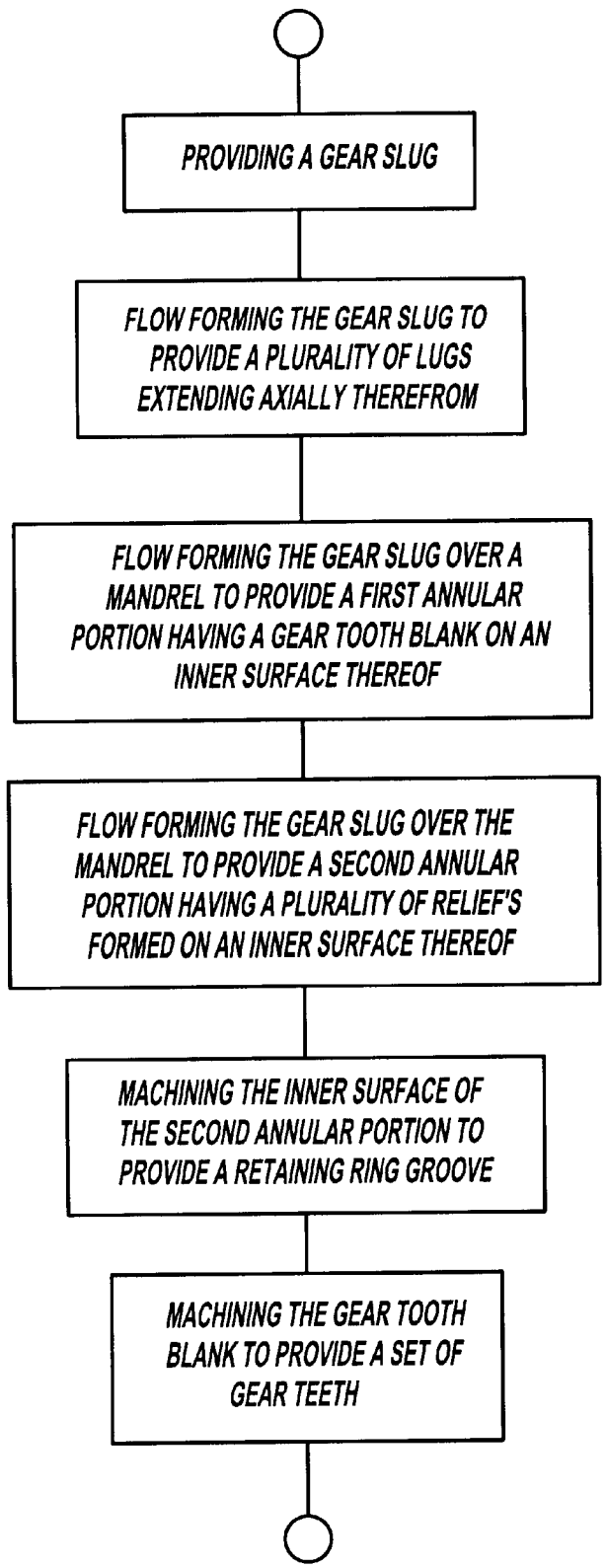
FIG. 4 is a block design representing the manufacturing process used for the fabrication of the present invention.

Referring now to FIG. 4, a preferred method of forming annulus gear 24 is schematically illustrated. Initially, a slug of suitable gear steel is provided within a die set of a flow forming press as is well known in the art. Initially, the press is energized and the gear slug flow formed to provide a plurality of lugs 94 extending axially therefrom. Next, a mandrel is positioned adjacent the gear slug and the press is further actuated to flow form the first annular portion 74 having a gear tooth blank 96 formed on an inner surface 98 thereof. The forming process continues such that the gear slug is further flow formed over the mandrel to provide the second annular portion 78 having a plurality of reliefs 82 formed on an inner surface 84 thereof. More specifically, the outer surface of the mandrel is provided with a radially outwardly step profile such that first annular portion 74 has an inner diameter which is less than the inner diameter of second annular portion 78. Furthermore, bumps are formed on the outer surface of the mandrel to form reliefs 82 on second annular portion 78.

At this point, the flow forming process is completed and annulus gear 24 may be removed from the flow forming press in a rough state. Next, annular groove 90 is formed in inner surface 84 and adapted to receive retainer ring 88. Lastly, gear tooth blank 96 is machined to provide a set of gear teeth 76 which are engageable with planetary gears 28 of first planetary gear set 16.

The present invention provides a one-piece or monolithic annulus gear having features which readily adapt annulus gear 24 for coupling with associated components within the automatic transmission of an automotive vehicle. Heretofore, the design of such components has required multiple piece components with additional welding and machining steps necessitated. In contrast, the present invention provides a simple design and method of construction which enhances the simplicity of fabrication and assembly of the automatic transmission.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teaching of the invention without departing from the essential scope thereof. Therefore it is intended that the invention not be limited to the particular embodiment illustrated by the drawings and described in the specification as the best mode presently contemplated for carrying out this invention, but that the invention will include any embodiments falling within the description of the appended claims.

What is claimed:

1. An automatic transmission comprising:

an input shaft;

an output shaft;

a first planetary gear set operably coupled between said input shaft and said output shaft;

a clutch assembly having a clutch hub; and a second planetary gear set including a sun gear operably coupled to said input shaft, a planetary carrier operably coupled to said output shaft, a plurality of planetary gears supported on said planetary carrier and a one-piece annulus gear including a first annular portion having a set of gear teeth formed therein for engagement with said plurality of planetary gears and a second annular portion operably coupled to said first planetary gear set for concurrent rotation therewith, said one-piece annulus gear including a plurality of lugs extending axially therefrom, said plurality of lugs receiving a plurality of tangs extending from said clutch hub for operably coupling said clutch hub and said annulus gear for concurrent rotation.

2. The automatic transmission of claim 1 wherein said one-piece annulus gear has a plurality of reliefs formed on an inner surface of said second annular portion, said plurality of reliefs receiving a plurality of tangs extending from a planetary carrier of said first planetary gear set.

3. The automatic transmission of claim 2 wherein said inner surface has a groove formed therein for receiving a retainer ring to secure said planetary carrier of said first planetary gear set to said one-piece annulus gear.

4. The automatic transmission of claim 1 wherein said one-piece annulus gear is formed from a gear slug using a flow forming process.

5. The automatic transmission of claim 4 wherein said one-piece annulus gear is formed using a mandrel to support an inner surface thereof during said flow forming process of said first and second annular portions.

6. A planetary gear set for use in an automatic transmission, the planetary gear set comprising:
   a sun gear;
   a planetary carrier;
   a plurality of planetary gears supported on said planetary carrier; and
   a monolithic annulus gear including a first annular portion having a set of gear teeth formed therein for engagement with said plurality of planetary gears and a second annular portion adapted for coupling to an adjacent planetary gear set, said monolithic annulus gear further including a plurality of lugs extending axially therefrom, said plurality of lugs receiving a plurality of tangs extending from a clutch hub for coupling said clutch hub and said monolithic annulus gear.

7. The planetary gear set of claim 6 wherein said monolithic annulus gear has a plurality of reliefs formed on an inner surface of said second annular portion, said plurality of reliefs receiving a plurality of tangs extending from an adjacent planetary carrier of said adjacent planetary gear set.

8. The planetary gear set of claim 7 wherein said inner surface has a groove formed therein for receiving a retainer ring to secure said adjacent planetary carrier to said monolithic annulus gear.

9. The planetary gear set of claim 6 wherein said monolithic annulus gear is formed from a gear slug using a flow forming process.

10. The planetary gear set of claim 9 wherein said monolithic annulus gear is formed using a mandrel to support and inner surface thereof during said flow forming process of said first and second annular portions.

11. A vehicular automatic transmission comprising:
    a transmission housing;
    an input shaft rotatably supported in said transmission housing;
    an output shaft rotatably supported in said transmission housing;
    a clutch assembly selectively operably to couple a clutch hub to said transmission housing;
    a planetary gear system selectively coupled between said input shaft and said output shaft, said planetary gear system having a first planetary gear set including a first sun gear, a one-piece annulus gear having a first annular portion coupled for concurrent rotation to said clutch hub, a first planetary carrier and a first plurality of planetary gears and a second planetary gear set including a second sun gear, a second annulus gear coupled for concurrent rotation to said first planetary carrier, a second planetary carrier coupled for concurrent rotation to a second annular portion of said one-piece annulus gear and a second plurality of planetary gears.

12. The automatic transmission of claim 11 wherein said one-piece annulus gear further comprises a plurality of lugs extending axially therefrom, said plurality of lugs receiving a plurality of tangs extending from said clutch hub.

13. The automatic transmission of claim 11 wherein said one-piece annulus gear has a plurality of reliefs formed on an inner surface of said second annular portion, said plurality of reliefs receiving a plurality of tangs extending from said second planetary carrier.

14. The automatic transmission of claim 13 wherein said inner surface has a groove formed therein for receiving a retainer ring to secure said second planetary carrier to said one-piece annulus gear.

15. The automatic transmission of claim 11 wherein said one-piece annulus gear is formed from a gear slug using a flow forming process.

16. The automatic transmission of claim 15 wherein said one-piece annulus gear is formed using a mandrel to support and inner surface thereof during said flow forming process of said first and second annular portions.

17. A vehicular automatic transmission comprising:
    a transmission housing;
    an input shaft rotatably supported in said transmission housing;
    an output shaft rotatably supported in said transmission housing;
    a clutch assembly selectively operably to couple a clutch hub to said transmission housing;
    a planetary gear system selectively coupled between said input shaft and said output shaft, said planetary gear system including a first planetary gear set and a second planetary gear set, said first planetary gear set including a one-piece annulus gear having a first annular portion coupled for concurrent rotation to said clutch hub, said second planetary gear set including a second annulus gear coupled for concurrent rotation to said first planetary carrier and a second planetary carrier coupled for concurrent rotation to a second annular portion of said one-piece annulus gear.

18. The automatic transmission of claim 17 wherein said one-piece annulus gear further comprises a plurality of lugs extending axially therefrom, said plurality of lugs receiving a plurality of tangs extending from said clutch hub.

19. The automatic transmission of claim 17 wherein said one-piece annulus gear has a plurality of reliefs formed on an inner surface of said second annular portion, said plurality of reliefs receiving a plurality of tangs extending from said second planetary carrier.

20. The automatic transmission of claim 19 wherein said inner surface has a groove formed therein for receiving a retainer ring to secure said second planetary carrier to said one-piece annulus gear.

* * * * *